US012719052B2

(12) United States Patent
Do et al.

(10) Patent No.: US 12,719,052 B2
(45) Date of Patent: Aug. 25, 2026

(54) POSITIVE ELECTRODE ACTIVE MATERIAL FOR LITHIUM SECONDARY BATTERY, METHOD FOR PREPARING THE SAME AND LITHIUM SECONDARY BATTERY COMPRISING THE SAME

(71) Applicant: LG Energy Solution, Ltd., Seoul (KR)

(72) Inventors: Joong-Yeop Do, Daejeon (KR); Eun-Sol Lho, Daejeon (KR); Kang-Joon Park, Daejeon (KR); Gi-Beom Han, Daejeon (KR); Min Kwak, Daejeon (KR); Sang-Min Park, Daejeon (KR); Dae-Jin Lee, Daejeon (KR); Sang-Wook Lee, Daejeon (KR); Wang-Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 646 days.

(21) Appl. No.: 18/027,844

(22) PCT Filed: Nov. 26, 2021

(86) PCT No.: PCT/KR2021/017685
§ 371 (c)(1),
(2) Date: Mar. 22, 2023

(87) PCT Pub. No.: WO2022/114872
PCT Pub. Date: Jun. 2, 2022

(65) Prior Publication Data

US 2023/0339777 A1 Oct. 26, 2023

(30) Foreign Application Priority Data

Nov. 27, 2020 (KR) ........................ 10-2020-0163238

(51) Int. Cl.
*H01M 4/36* (2006.01)
*C01G 53/50* (2025.01)
(Continued)

(52) U.S. Cl.
CPC ............ *H01M 4/366* (2013.01); *C01G 53/50* (2013.01); *C01G 53/82* (2025.01); *H01M 4/131* (2013.01);
(Continued)

(58) Field of Classification Search
CPC ..................................................... H01M 4/366
See application file for complete search history.

(56) References Cited

U.S. PATENT DOCUMENTS 8,993,167 B2 * 3/2015 Chang ..................... H01M 4/62 429/231.1
11,424,447 B2 * 8/2022 Park .................. H01M 10/0525
(Continued)

FOREIGN PATENT DOCUMENTS

CN 104681784 A * 6/2015 .......... H01M 4/5825
CN 107732176 A * 2/2018 ............ H01M 4/625
(Continued)

OTHER PUBLICATIONS

International Search Report for PCT/KR2021/017685 mailed Mar. 29, 2022. 3 pgs.

(Continued)

*Primary Examiner* — Amanda C. Walke
(74) *Attorney, Agent, or Firm* — Lerner David LLP

(57) ABSTRACT

A positive electrode active material comprising at least one secondary particle comprising an agglomerate of primary macro particles, a method for preparing the same and a lithium secondary battery comprising the same.

According to an embodiment of the present disclosure, it is possible to improve the electrical conductivity of the positive electrode active material surface by coating a conductive carbon material on the surface of the secondary particle.

(Continued)

Accordingly, it is possible to provide a nickel-based positive electrode active material with improved life performance by minimizing conductive network losses after cycles.

13 Claims, 4 Drawing Sheets

(51) Int. Cl.

| | |
|---|---|
| ***C01G 53/82*** | (2025.01) |
| ***H01M 4/131*** | (2010.01) |
| ***H01M 4/62*** | (2006.01) |
| ***H01M 10/052*** | (2010.01) |

(52) U.S. Cl.

CPC ......... *H01M 4/625* (2013.01); *H01M 10/052* (2013.01); *C01P 2004/03* (2013.01); *C01P 2004/61* (2013.01); *C01P 2006/11* (2013.01); *C01P 2006/40* (2013.01)

(56) References Cited

U.S. PATENT DOCUMENTS

| | | | |
|---|---|---|---|
| 2007/0202405 A1 | 8/2007 | Shizuka et al. | |
| 2010/0112449 A1 | 5/2010 | Fujita et al. | |
| 2011/0151328 A1 | 6/2011 | Chang et al. | |
| 2011/0177391 A1 | 7/2011 | Ookita et al. | |
| 2013/0337326 A1 | 12/2013 | Mun et al. | |
| 2014/0315087 A1 | 10/2014 | Yu et al. | |
| 2015/0010819 A1 | 1/2015 | Lee et al. | |
| 2015/0243978 A1 | 8/2015 | Shon et al. | |
| 2017/0194638 A1 | 7/2017 | Cho et al. | |
| 2018/0226639 A1 | 8/2018 | Chu et al. | |
| 2019/0173076 A1 | 6/2019 | Kim et al. | |
| 2019/0198857 A1 | 6/2019 | Oh et al. | |
| 2019/0260019 A1 | 8/2019 | Jung et al. | |
| 2020/0161650 A1 | 5/2020 | Park et al. | |
| 2020/0235381 A1 | 7/2020 | Park et al. | |
| 2021/0143425 A1 | 5/2021 | An et al. | |
| 2021/0408537 A1 | 12/2021 | Hwang et al. | |
| 2022/0059836 A1 | 2/2022 | Hiratsuka et al. | |
| 2023/0378456 A1* | 11/2023 | Kim | H01M 4/131 |

FOREIGN PATENT DOCUMENTS

| | | | | |
|---|---|---|---|---|
| CN | 108258226 A | | 7/2018 | |
| CN | 108878859 A | | 11/2018 | |
| CN | 109244448 A | * | 1/2019 | H01M 10/0525 |
| CN | 109888250 A | | 6/2019 | |
| CN | 109962213 A | | 7/2019 | |
| CN | 110431695 A | | 11/2019 | |
| CN | 111225888 A | | 6/2020 | |
| JP | 4529784 B2 | | 8/2010 | |
| JP | 2015018803 A | | 1/2015 | |
| JP | 2020515010 A | | 5/2020 | |
| KR | 2010-0081954 A | | 7/2010 | |
| KR | 20130139711 A | | 12/2013 | |
| KR | 2014-0126586 A | | 10/2014 | |
| KR | 2015-0015835 A | | 2/2015 | |
| KR | 20150065046 A | | 6/2015 | |
| KR | 20150099219 A | | 8/2015 | |
| KR | 101785262 B1 | | 10/2017 | |
| KR | 20190043855 A | | 4/2019 | |
| KR | 20190059249 A | | 5/2019 | |
| KR | 20190065963 A | | 6/2019 | |
| KR | 2020-0059164 A | | 5/2020 | |
| KR | 20240148717 A | * | 10/2024 | H01M 4/13 |
| WO | 2008120442 A1 | | 10/2008 | |
| WO | 2010035681 A1 | | 4/2010 | |
| WO | 2020137296 A1 | | 7/2020 | |

OTHER PUBLICATIONS

Search Report dated Jan. 15, 2025 from the Office Action for Chinese Application No. 202180052231.5 Issued Jan. 17, 2025, pp. 1-3.

Nanthagopal, M. et al., "Nitrogen-doped carbon-coated Li[Ni0. 8Co0.1Mn0 . 1]02 cathode material for enhanced lithium-ion storage" Elsevier Ltd, Applied Surface Science, Jun. 2019, pp. 871-878, vol. 492.

Anonymous, "Characterization method of compaction density of cathode and anode electrode materials for lithium battery", Initial Energy Science, .Jul. 2020, pp. 1-6.

Malvern, "A basic guide to particle characterization", Whitepaper , Malvern, Instruments Limited, UK, Jan. 2015, pp. 1-24.

Extended European Search Report including Written Opinion for Application No. 21898697.4 dated Feb. 9, 2024, pp. 1-11.

* cited by examiner

POSITIVE ELECTRODE ACTIVE MATERIAL FOR LITHIUM SECONDARY BATTERY, METHOD FOR PREPARING THE SAME AND LITHIUM SECONDARY BATTERY COMPRISING THE SAME

CROSS-REFERENCE TO RELATED APPLICATIONS

The present application is a national phase entry under 35 U.S.C. § 371 of International Application No. PCT/KR2021/017685, filed on Nov. 26, 2021, which claims priority from Korean Patent Application No. 10-2020-0163238, filed on Nov. 27, 2020, the disclosures of which are incorporated herein by reference.

TECHNICAL FIELD

The present disclosure relates to a positive electrode active material for a lithium secondary battery comprising primary macro particles and a method for preparing the same.

BACKGROUND ART

Recently, with the widespread use of electronic devices using batteries, for example, mobile phones, laptop computers and electric vehicles, there is a fast growing demand for secondary batteries with small size, light weight and relatively high capacity. In particular, lithium secondary batteries have are gaining attention as a power source for driving mobile devices due to their light weight and high energy density advantages. Accordingly, there are many efforts to improve the performance of lithium secondary batteries.

A lithium secondary battery includes an organic electrolyte solution or a polymer electrolyte solution filled between a positive electrode and a negative electrode made of an active material capable of intercalating and deintercalating lithium ions, and electrical energy is produced by oxidation and reduction reactions during intercalation/deintercalation of lithium ions at the positive electrode and the negative electrode.

The positive electrode active material of the lithium secondary battery includes lithium cobalt oxide ($LiCoO_2$), lithium nickel oxide ($LiNiO_2$), lithium manganese oxide ($LiMnO_2$ or $LiMn_2O_4$) and a lithium iron phosphate compound ($LiFePO_4$). Among them, lithium cobalt oxide ($LiCoO_2$) is widely used due to its high operating voltage and large capacity advantages, and is used as a positive electrode active material for high voltage. However, cobalt (Co) has a limitation on the use in a large amount as a power source in the field of electric vehicles due to its price rise and unstable supply, and thus there is a need for development of an alternative positive electrode active material. Accordingly, nickel cobalt manganese based lithium composite transition metal oxide (hereinafter simply referred to as 'NCM-based lithium composite transition metal oxide') with partial substitution of nickel (Ni) and manganese (Mn) for cobalt (Co) has been developed.

Meanwhile, the conventionally developed NCM-based lithium composite transition metal oxide is in the form of a secondary particle formed by agglomeration of primary micro particles, and has a large specific surface area and low particle strength. Additionally, when the positive electrode active material comprising the secondary particle formed by agglomeration of primary micro particles is used to manufacture an electrode, followed by a rolling process, particle cracking is severe and a large amount of gas is produced during the cell operation, resulting in low stability. In particular, high-Ni NCM-based lithium composite transition metal oxide having higher nickel (Ni) content to ensure high capacity is widely used in high energy density cells due to its high capacity. However, as the nickel content increases, thermal stability decreases and electrochemical side reactions increase, resulting in higher resistance and larger amount of gas generation.

To solve the above-described problem, monoliths have been studied and developed. The monolith exists independently of the secondary particle, and refers to a particle having seemingly absent grain boundary. The monolith minimizes the unstable interface of the positive electrode active material surface, thereby improving thermal stability and reducing gas production.

However, the monolith has a smaller area participating in charge/discharge than the secondary particle. Accordingly, the monolith suffers more side reactions due to a larger amount of currents flowing in the same area during charging/discharging, and a resistive layer is formed on the particle surface. Additionally, the monolith cracks to generate fine particles when pressed under predetermined pressure in a rolling process, and the fine particles increase unstable interfaces that cause side reactions with the electrolyte solution, resulting in battery performance degradation.

DISCLOSURE

Technical Problem

The present disclosure is designed to solve the above-described problem, and therefore the present disclosure is directed to providing a positive electrode active material comprising a new concept of secondary particle.

The present disclosure is further directed to improving the electrical and chemical properties by forming a coating layer comprising a carbon material on the surface of the secondary particle.

Specifically, it is possible to improve the cycling characteristics by minimizing conductive network losses after charging and discharging.

Technical Solution

An aspect of the present disclosure provides a positive electrode active material according to the following embodiments.

Specifically, there is provided a positive electrode active material for a lithium secondary battery comprising at least one secondary particle comprising an agglomerate of primary macro particles; and a coating layer disposed on a surface of the secondary particle, the coating layer comprising a carbon material, wherein an average particle size D50 of the primary macro particle is 1.5 μm or more, an average particle size D50 of the secondary particle is 3 to 10 μm, and the positive electrode active material comprises nickel-based lithium transition metal oxide.

The carbon material included in the coating layer may be present in an amount of 0.3 to 5 parts by weight based on 100 parts by weight of the secondary particle.

The coating layer may be 10 nm to 50 nm in thickness.

The carbon material may comprise at least one selected from the group consisting of carbon nanotubes, carbon nanofibers, carbon nanoribbons, carbon nanobelts, carbon nanorods, graphene, graphene oxide, reduced graphene oxide, carbon black, activated carbon and mesoporous carbon.

The nickel-based lithium transition metal oxide may be $Li_a[Ni_xCo_yMn_{1-x-y}]O_{2+b}$ ($0.9 \le a \le 1.5$, $-0.1 \le b \le 1.0$, $0.5 \le x \le 0.95$, $0 < y \le 0.5$, M is at least one selected from the group consisting of Mn, Mg, Al, Ti, V, Y and Zr).

A ratio of the average particle size D50 of the primary macro particle/an average crystal size of the primary macro particle may be 2 or more.

An average crystal size of the primary macro particle may be 130 nm or more.

A ratio of the average particle size D50 of the secondary particle/the average particle size D50 of the primary macro particle may be 2 to 5 times.

The primary macro particle may be separated from the secondary particle and may not crack itself in a rolling process of the positive electrode active material The rolling process may be performed in a 1-ton condition.

A ratio of presence of fine particles of less than 1 μm may be 1% or less when a rolling process of the positive electrode active material is performed in a 9-ton condition.

An aspect of the present disclosure provides a positive electrode for a lithium secondary battery comprising the above-described positive electrode active material.

An aspect of the present disclosure provides a lithium secondary battery comprising the above-described positive electrode active material.

An aspect of the present disclosure provides the following preparation method. Specifically, the present disclosure relates to a method for preparing a positive electrode active material for a lithium secondary battery comprising (S1) mixing a precursor comprising nickel, cobalt and manganese with hydroxide to prepare a porous nickel-based lithium transition metal hydroxide precursor; (S2) mixing the porous nickel-based lithium transition metal hydroxide precursor with a lithium raw material and performing thermal treatment to prepare a secondary particle; and (S3) mixing the secondary particle with a carbon material to form a coating layer comprising the carbon material on a surface of the secondary particle, wherein the positive electrode active material comprises at least one secondary particle comprising an agglomerate of primary macro particles; and the coating layer disposed on the surface of the secondary particle, the coating layer comprising the carbon material, an average particle size D50 of the primary macro particle is 1.5 μm or more, an average particle size D50 of the secondary particle is 3 to 10 μm, and the positive electrode active material comprises nickel-based lithium transition metal oxide.

The step (S1) may be performed at 35 to 80° C., and the step (S2) may be performed at 700 to 1000° C.

The step (S3) may be performed at room temperature.

The step (S1) may be performed in a pH condition of 8 to 12.

The method may not comprise a washing process between the step (S2) and the step (S3).

A tap density of the porous nickel-based lithium transition metal hydroxide precursor of the step (S2) may be 2.0 g/cc or less.

Advantageous Effects

According to an embodiment of the present disclosure, there may be provided a positive electrode active material comprising a secondary particle comprising primary macro particles having the increased average particle size D50. The use of the secondary particle may provide the positive electrode active material with lower resistance and increased thermal stability compared to the conventional secondary particle.

According to an embodiment of the present disclosure, the coating layer comprising the carbon material is formed on the surface of the secondary particle. Accordingly, it is possible to improve the electrical conductivity of the positive electrode active material surface. Additionally, the carbon material coating may smoothen the surface of the secondary particle having large surface roughness, thereby increasing the press density and reducing the fine particle generation in the rolling process.

Additionally, the use of the conductive carbon material may eliminate the addition of a conductive material in the manufacture of an electrode comprising the positive electrode active material. Accordingly, it is possible to increase the amount of the positive electrode active material included in the electrode, thereby increasing the energy density.

DESCRIPTION OF DRAWINGS

The accompanying drawings illustrate the preferred embodiment of the present disclosure, and together with the above description, serve to help a further understanding of the technical aspects of the present disclosure, so the present disclosure should not be construed as being limited to the drawings. Meanwhile, the shape, size, scale or proportion of the elements in the drawings of the specification may be exaggerated to emphasize a more clear description.

BEST MODE

Figure 1:
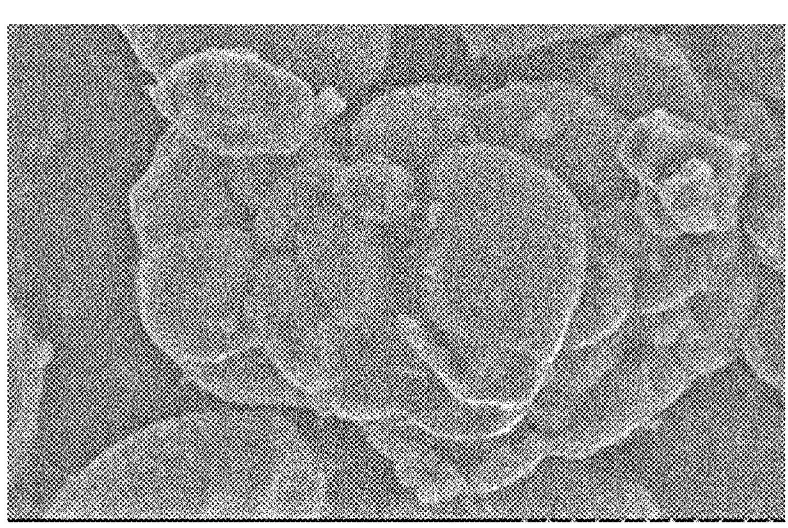
FIG. 1 is a scanning electron microscopy (SEM) image of a positive electrode active material according to an embodiment of the present disclosure.
Figure 2:
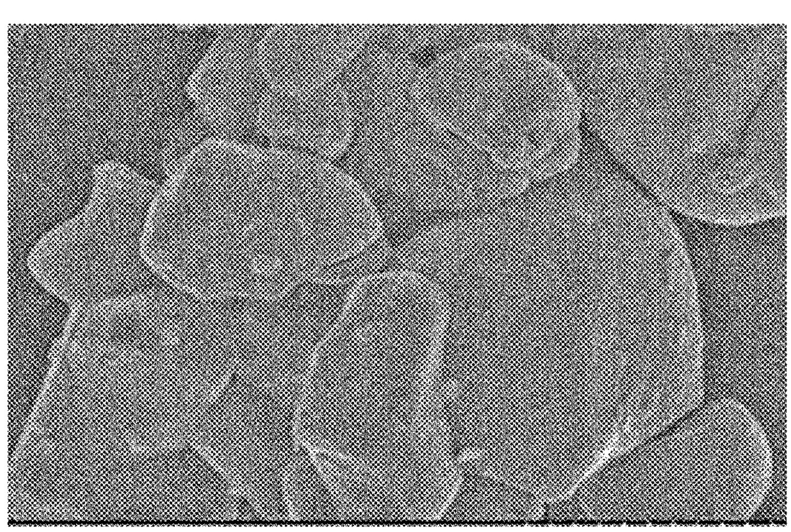
FIG. 2 is an SEM image of a positive electrode active material according to comparative example 1 of the present disclosure.
Figure 3:
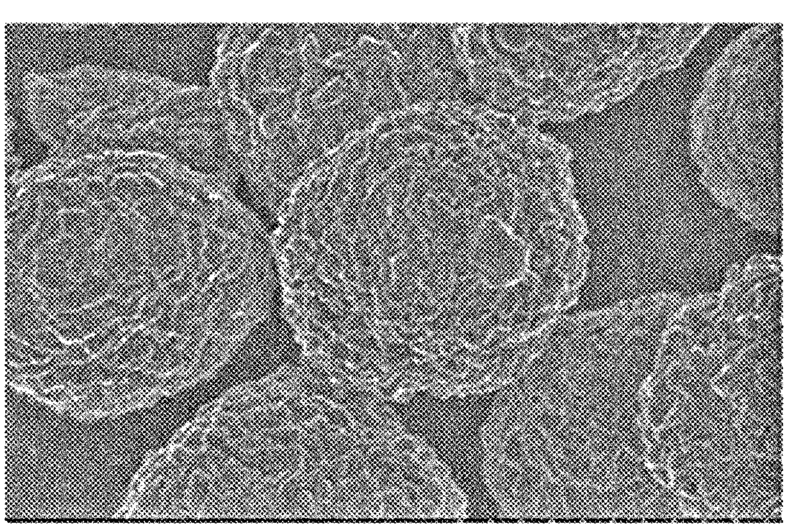
FIG. 3 is an SEM image of a positive electrode active material according to comparative example 2 of the present disclosure.
Figure 4:
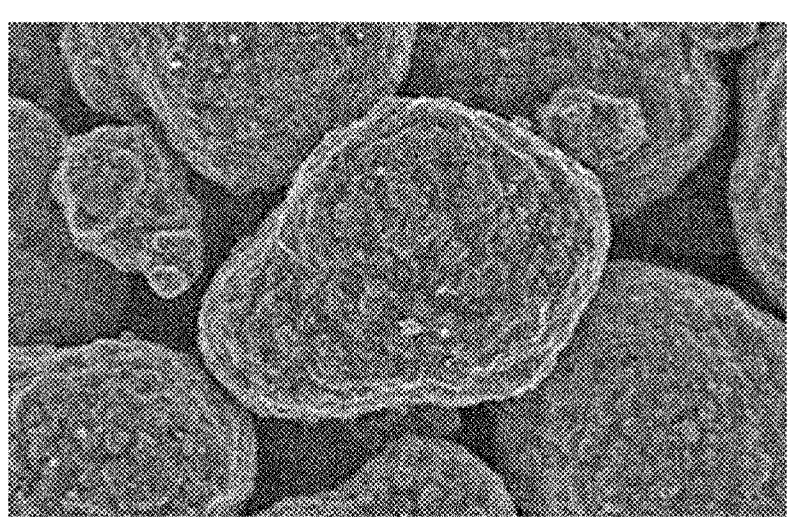
FIG. 4 is an SEM image of a positive electrode active material according to comparative example 3 of the present disclosure.

Hereinafter, embodiments of the present disclosure will be described in detail. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the disclosure of the embodiments described herein is just a most preferred embodiment of the present disclosure, but not intended to fully describe the technical aspects of the present disclosure, so it should be understood that a variety of other equivalents and modifications could have been made thereto at the time that the application was filed.

Unless the context clearly indicates otherwise, it will be understood that the term "comprises" when used in this specification, specifies the presence of stated elements, but does not preclude the presence or addition of one or more other elements.

In the specification and the appended claims, “comprising multiple crystal grains” refers to a crystal structure formed by two or more crystal grains having a specific range of average crystal sizes. In this instance, the crystal size of the crystal grain may be quantitatively analyzed using X-ray diffraction analysis (XRD) by Cu Ka X-ray (Xra). Specifically, the average crystal size of the crystal grain may be quantitatively analyzed by putting a prepared particle into a holder and analyzing diffraction grating for X-ray radiation onto the particle.

In the specification and the appended claims, D50 may be defined as a particle size at 50% of particle size distribution, and may be measured using a laser diffraction method. For example, a method for measuring the average particle size D50 of a positive electrode active material may include dispersing particles of the positive electrode active material in a dispersion medium, introducing into a commercially available laser diffraction particle size measurement device (for example, Microtrac MT 3000), irradiating ultrasound of about 28 kHz with the output power of 60 W, and calculating the average particle size D50 corresponding to 50% of cumulative volume in the measurement device.

In the present disclosure, ‘primary particle’ refers to a particle having seemingly absent grain boundary when observed with the field of view of 5000 to 20000 magnification using a scanning electron microscope. In the present disclosure, the primary particle may be classified into a primary micro particle and a primary macro particle according to the average particle size D50.

In the present disclosure, ‘secondary particle’ is a particle formed by agglomeration of the primary particles.

In the present disclosure, ‘monolith’ refers to a particle that exists independently of the secondary particle, and has seemingly absent grain boundary, and for example, it is a particle having the particle diameter of 0.5 μm or more.

In the present disclosure, ‘particle’ may include any one of the monolith, the secondary particle and the primary particle or all of them.

Positive Electrode Active Material

An aspect of the present disclosure provides a positive electrode active material in the form of a secondary particle of different type from the conventional art.

Specifically, there is provided a positive electrode active material for a lithium secondary battery 1) comprising at least one secondary particle comprising an agglomerate of primary macro particles, 2) wherein the average particle size D50 of the primary macro particle is 1.5 (or more; and 3) a coating layer disposed on the surface of the secondary particle, the coating layer comprising a carbon material,
4) wherein the average particle size D50 of the secondary particle is 3 to 10 μm, and
5) the positive electrode active material comprises nickel-based lithium transition metal oxide.

The secondary particle having the above-described features may provide a nickel-based positive electrode active material with improved stability at high temperature and high voltage.

Hereinafter, the above-described features 1) to 5) of the secondary particle will be described in detail.

Particle Shape and Primary Macro Particle

In general, nickel-based lithium transition metal oxide is a secondary particle. The secondary particle may be an agglomerate of primary particles.

Specifically, a secondary particle of dense nickel-based lithium transition metal hydroxide prepared by a coprecipitation method is used for a precursor, and when the precursor is mixed with a lithium precursor and sintered at the temperature of less than 960° C., a secondary particle of lithium transition metal oxide comprising primary micro particles may be obtained. However, when a positive electrode active material comprising the conventional secondary particle is coated on a current collector, followed by a rolling process, the particle itself cracks, and the specific surface area increases. When the specific surface area increases, rock salt is formed on the surface and the resistance reduces.

To solve this problem, monolithic positive electrode active materials have been additionally developed. Specifically, as opposed to the conventional method using the above-described secondary particle of dense nickel-based lithium transition metal hydroxide as the precursor, a porous precursor rather than the conventional precursor and the higher sintering temperature for the same nickel content are used to obtain monolithic nickel-based lithium transition metal oxide, which does not assume the form of a secondary particle any longer. However, in the synthesis of the monolith, the monolith changes in the crystal structure of the particle surface from a layered structure to a rock salt structure. The surface of the nonconductive rock salt structure hinders the movement of lithium ions during charge/discharge, resulting in a shorter life of the battery.

An aspect of the present disclosure is provided to solve the problem.

In case that sintering is only performed at higher sintering temperature using the dense precursor like the conventional art, the average particle size D50 of the primary particle increases, and at the same time, the average particle size D50 of the secondary particle increases as well.

In contrast, the secondary particle according to an aspect of the present disclosure is different from the method for obtaining the conventional monolith as described below.

As described above, the conventional monoliths are formed at higher primary sintering temperature, but still use the conventional precursor for secondary particles. In contrast, the secondary particle according to an aspect of the present disclosure uses a porous precursor. Accordingly, it is possible to grow the primary macro particle having a large particle size without increasing the sintering temperature, and by contrast, the secondary particle grows less than the conventional art.

Accordingly, the secondary particle according to an aspect of the present disclosure has the equal or similar average particle size D50 to the conventional art and a large average particle size D50 of the primary particle. That is, as opposed to the typical configuration of the conventional positive electrode active material, i.e., in the form of a secondary particle formed by agglomeration of primary particles having a small average particle size, it is provided a secondary particle formed by agglomeration of primary macro particles, namely, primary particles having the increased size.

In the present disclosure, the ‘primary macro particle’ has the average particle size D50 of 1.5 μm or more.

In a specific embodiment of the present disclosure, the average particle size of the primary macro particle may be 1.5 μm or more, 2 μm or more, 2.5 μm or more, 3 μm or more, or 3.5 μm or more, and may be 5 μm or less, 4.5 μm or less, or 4 μm or less. When the average particle size of the primary macro particle is less than 1.5 μm, it corresponds to the conventional secondary micro particle, and particle cracking may occur in the rolling process.

In the present disclosure, the ‘primary macro particle’ preferably has a ratio of the average particle size D50/the average crystal size of 2 or more. That is, when compared with the primary micro particle that forms the conventional secondary particle, the primary macro particle may have simultaneous growth of the average particle size and the average crystal size of the primary particle.

From the perspective of crack, a seemingly absent grain boundary like the conventional monolith and a large average particle size are advantageous. Accordingly, the inventors have focused on the growth of the average particle size D50 of the primary particle. When the average particle size D50 of the primary particle is only increased by over-sintering, rock salt is formed on the surface of the primary particle and the resistance increases. To solve the problem, the inventors discovered that the resistance is reduced by increasing the crystal size of the primary macro particle together.

That is, in the present disclosure, the primary macro particle is preferably a particle having a large average particle size as well as a large average crystal size and a seemingly absent grain boundary.

As described above, when the average particle size and the average crystal size of the primary particle are simultaneously grown, it is advantageous in terms of low resistance and long life, compared to the conventional monolith having the increased resistance due to the rock salt formed on the surface by sintering at high temperature.

As described above, compared to the conventional monolith, the "secondary particle formed by agglomeration of secondary macro particles" used in an aspect of the present disclosure is advantageous in terms of low resistance resulting from the increased size of the primary particle itself and the reduced rock salt formation.

In this instance, the average crystal size of the primary macro particle may be quantitatively analyzed using X-ray diffraction analysis (XRD) by Cu Kα X-ray. Specifically, the average crystal size of the primary macro particle may be quantitatively analyzed by putting the prepared particle into a holder and analyzing diffraction grating for X-ray radiation onto the particle.

In a specific embodiment of the present disclosure, the ratio of the average particle size D50/the average crystal size may be 2 or more, 2.5 or more, or 3 or more, and may be 50 or less, 40 or less, or 35 or less.

Additionally, the average crystal size of the primary macro particle may be 130 nm or more, 150 nm or more, 170 nm or more, or 200 nm or more, and may be 300 nm or less, 270 nm or less, or 250 nm or less.

Secondary Particle

The secondary particle according to an aspect of the present disclosure has the equal or similar average particle size D50 to the conventional art and a large average particle size D50 of the primary particle. That is, as opposed to the typical configuration of the conventional positive electrode active material, i.e., in the form of a secondary particle formed by agglomeration of primary particles having a small average particle size, there is provided a secondary particle formed by agglomeration of primary macro particles, namely, primary particles having the increased size.

In a specific embodiment of the present disclosure, the secondary particle may be an agglomerate of 1 to 10 primary macro particles. More specifically, the secondary particle may be an agglomerate of 1 or more, 2 or more, 3 or more, or 4 or more primary macro particles in the numerical range, and may be an agglomerate of 10 or less, 9 or less, 8 or less, or 7 or less primary macro particles in the numerical range.

The secondary particle according to an aspect of the present disclosure has the average particle size D50 of 3 μm to 10 μm. More specifically, the average particle size D50 is 3 μm or more, 3.5 μm or more, 4 μm or more, or 4.5 μm or more, and is 10 μm or less, 8 μm or less, or 7 μm or less.

In general, no matter what particle type, at the same composition, the particle size and the average crystal size in the particle increase with the increasing sintering temperature. In contrast, in the secondary particle according to an aspect of the present disclosure, the primary macro particle having a large particle size may grow using the porous precursor without increasing the sintering temperature, and by contrast, the secondary particle grows less than the conventional art.

Accordingly, the secondary particle according to an aspect of the present disclosure has the equal or similar average particle size D50 to the conventional secondary particle and comprises primary macro particles having a larger average particle size and a larger average crystal size than the conventional primary micro particle.

In a specific embodiment of the present disclosure, a ratio of the average particle size D50 of the secondary particle/the average particle size D50 of the primary macro particle may be 2 to 5 times.

In this instance, the primary macro particle is separated but does not crack in the rolling process of the secondary particle. In this instance, the rolling condition may be the pressure of 1 to 9 tons. Specifically, the rolling condition may be the pressure of 1 ton.

The secondary particle comprises nickel-based lithium transition metal oxide.

Specifically, the nickel-based lithium transition metal oxide comprises $Li_a[Ni_xCo_yMn^{1-x-y}]O_{2+b}$($0.9 \leq a \leq 1.5$, $-0.1 \leq b \leq 1.0$, $0.5 < x \leq 0.95$, and $0 < y \leq 0.5$).

For example, the nickel-based lithium transition metal oxide may be selected from the group consisting of $LiNi_{0.8}Co_{0.1}Mn_{0.1}O_2$, $LiNi_{0.6}Co_{0.2}Mn_{0.2}O_2$, $LiNi_{0.5}Co_{0.2}Mn_{0.3}O_2$, and $LiNi_{0.5}Co_{0.3}Mn_{0.2}O_2$.

Nickel (Ni) contributes to increasing the potential and capacity of the secondary battery, and an amount corresponding to x may be included in an amount of $0<x<1$. When an x value is 0, the charge/discharge capacity characteristics may degrade, and when the x value is larger than 1, the structure of the active material and the thermal stability may reduce, and as a consequence, the life characteristics may degrade. When considering the higher potential and higher capacity effect by the control of the nickel content, the nickel may be included in an amount of more specifically, $0.5 \leq x < 1$, and even more specifically, $0.5 \leq x \leq 0.8$.

Cobalt (Co) contributes to improving the charge/discharge cycling characteristics of the active material, and an amount corresponding to y may be included in an amount of $0 < y \leq 0.35$. When $y=0$, the structure stability and lithium ion conductivity may reduce, and as a consequence, the charge/discharge capacity may reduce, and when y is larger than 0.35, the operating voltage of the positive electrode active material may increase and the charge/discharge capacity may reduce under a given upper limit of voltage. When considering the cycling characteristics improving effect of the active material by the control of the cobalt content, the cobalt may be included in an amount of more specifically $0.1 \leq y < 0.35$, and even more specifically $0.1 \leq y \leq 0.3$.

Meanwhile, in the present disclosure, part of the surface of the secondary particle comprises a coating layer comprising a carbon material.

The carbon material included in the coating layer may be present in an amount of 0.3 to 5 parts by weight based on 100 parts by weight of the secondary particle.

The coating layer may be 10 nm to 50 nm in thickness.

The carbon material may comprise at least one selected from the group consisting of carbon nanotubes, carbon nanofibers, carbon nanoribbons, carbon nanobelts, carbon nanorods, graphene, graphene oxide, reduced graphene oxide, carbon black, activated carbon and mesoporous carbon.

The inclusion of the carbon material coating layer may improve the electrical conductivity of the positive electrode active material surface. Additionally, the carbon material coating may smoothen the surface of the secondary particle having large surface roughness, thereby increasing the press density and reducing the fine particle generation in the rolling process. Specifically, in the rolling process of the positive electrode active material in 9 ton condition, the ratio of the presence of fine particles of less than 1 (m may be 1% or less, and more specifically 0.6% or less.

Additionally, the use of the conductive carbon material may eliminate the addition of a conductive material in the manufacture of an electrode comprising the positive electrode active material. Accordingly, it is possible to increase the amount of the positive electrode active material included in the electrode, thereby increasing the energy density.

Method for Preparing the Positive Electrode Active Material

The positive electrode active material according to an aspect of the present disclosure may be prepared by the following method. However, the present disclosure is not limited thereto.

Specifically, the present disclosure relates to a method for preparing a positive electrode active material for a lithium secondary battery, comprising:

(S1) mixing a precursor comprising nickel, cobalt and manganese with hydroxide to prepare a porous nickel-based lithium transition metal hydroxide precursor;

(S2) mixing the porous nickel-based lithium transition metal hydroxide precursor with a lithium raw material and performing thermal treatment to prepare a secondary particle; and (S3) mixing the secondary particle with a carbon material compound and milling, wherein the positive electrode active material comprises at least one secondary particle comprising an agglomerate of primary macro particles; and the coating layer disposed on the surface of the secondary particle, the coating layer comprising the carbon material, the average particle size D50 of the primary macro particle is 1.5 μm or more, the average particle size D50 of the secondary particle is 3 to 10 μm, and the positive electrode active material comprises nickel-based lithium transition metal oxide.

The method for preparing a positive electrode active material will be described in further detail for each step.

To begin with, the positive electrode active material precursor comprising nickel (Ni), cobalt (Co) and manganese (Mn) is prepared.

In this instance, the precursor for preparing the positive electrode active material may be a commercially available positive electrode active material precursor, or may be prepared by a method for preparing a positive electrode active material precursor well known in the corresponding technical field.

For example, the precursor may be prepared by adding an ammonium cation containing complex forming agent and a basic compound to a transition metal solution comprising a nickel containing raw material, a cobalt containing raw material and a manganese containing raw material and causing coprecipitation reaction.

The nickel containing raw material may include, for example, nickel containing acetate, nitrate, sulfate, halide, sulfide, hydroxide, oxide or oxyhydroxide, and specifically, may include at least one of $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, an aliphatic nickel salt or nickel halide, but is not limited thereto.

The cobalt containing raw material may include cobalt containing acetate, nitrate, sulfate, halide, sulfide, hydroxide, oxide or oxyhydroxide, and specifically, may include at least one of $Co(OH)_2$, CoOOH, $Co(OCOCH_3)_2 \cdot 4H_2O$, $Co(NO_3)_2 \cdot 6H_2O$, $CoSO_4$, or $Co(SO_4)_2 \cdot 7H_2O$, but is not limited thereto.

The manganese containing raw material may include, for example, at least one of manganese containing acetate, nitrate, sulfate, halide, sulfide, hydroxide, oxide or oxyhydroxide, and specifically, may include, for example, at least one of manganese oxide such as $Mn_2O_3$, $MnO_2$, $Mn_3O_4$; a manganese salt such as $MnCO_3$, $Mn(NO_3)_2$, $MnSO_4$, manganese acetate, a manganese salt of dicarboxylic acid, manganese citrate and an aliphatic manganese salt; manganese oxyhydroxide or manganese chloride, but is not limited thereto.

The transition metal solution may be prepared by adding the nickel containing raw material, the cobalt containing raw material and the manganese containing raw material to a solvent, to be specific, water, or a mixed solvent of water and an organic solvent (for example, alcohol, etc.) that mixes with water to form a homogeneous mixture, or by mixing an aqueous solution of the nickel containing raw material, an aqueous solution of the cobalt containing raw material and the manganese containing raw material.

The ammonium cation containing complex forming agent may include, for example, at least one of $NH_4OH$, $(NH_4)_2SO_4$, $NH_4NO_3$, $NH_4Cl$, $CH_3COONH_4$ or $NH_4CO_3$, but is not limited thereto. Meanwhile, the ammonium cation containing complex forming agent may be used in the form of an aqueous solution, and in this instance, a solvent may include water or a mixture of water and an organic solvent (specifically, alcohol, etc.) that mixes with water to form a homogeneous mixture.

The basic compound may include at least one of hydroxide or hydrate of alkali metal or alkaline earth metal such as NaOH, KOH or $Ca(OH)_2$. The basic compound may be used in the form of an aqueous solution, and in this instance, a solvent may include water, or a mixture of water and an organic solvent (specifically, alcohol, etc.) that mixes with water to form a homogeneous mixture.

The basic compound may be added to control the pH of the reaction solution, and may be added in such an amount that the pH of the metal solution is 8 to 12.

Subsequently, the precursor comprising nickel, cobalt and manganese may be mixed with hydroxide to prepare a porous nickel-based lithium transition metal hydroxide precursor.

In this instance, the coprecipitation reaction may be performed at 35° C. to 80° C. in an inert atmosphere of nitrogen or argon.

Accordingly, the porous nickel-based lithium transition metal hydroxide precursor may be prepared by mixing the precursor comprising nickel, cobalt and manganese with hydroxide (S1).

Particles of nickel-cobalt-manganese hydroxide are produced by the above-described process, and settle down in the reaction solution. The precursor having the nickel (Ni) content of 60 mol % or more in the total metal content may be prepared by controlling the concentration of the nickel containing raw material, the cobalt containing raw material and the manganese containing raw material. The settled nickel-cobalt-manganese hydroxide particles are separated by the common method and dried to obtain the nickel-cobalt-manganese precursor. The precursor may be a secondary particle formed by agglomeration of primary particles.

Subsequently, the above-described precursor is mixed with the lithium raw material and goes through thermal treatment (primary sintering) (S2).

The lithium raw material may include, without limitation, any type of material that dissolves in water, and may include, for example, lithium containing sulfate, nitrate, acetate, carbonate, oxalate, citrate, halide, hydroxide or oxyhydroxide. Specifically, the lithium raw material may include at least one of $Li_2CO_3$, $LiNO_3$, $LiNO_2$, LiOH, $LiOH\cdot H_2O$, LiH, LIF, LiCl, LiBr, LiI, $CH_3COOLi$, $Li_2O$, $Li_2SO_4$, $CH_3COOLi$, or $Li_3C_6H_5O_7$.

In the case of high-Ni NCM-based lithium composite transition metal oxide having the nickel (Ni) content of 60 mol % or more, the primary sintering may be performed at 700 to 1,000° C., more preferably 780 to 980° C., and even more preferably 780 to 900° C. The primary sintering may be performed in air or an oxygen atmosphere, and may be performed for 15 to 35 hours.

Subsequently, the primary sintering may be followed by mixing the secondary particle with the carbon material compound and milling (S3).

In an aspect of the present disclosure, the carbon material compound coating is performed by a mechanical method as opposed to the conventional art. For example, the carbon material compound may be coated on the surface of the secondary particle by mixing or milling.

That is, the step (S3) may be performed at room temperature.

In other words, the step (S3) does not undergo any thermal treatment process. As described above, it is possible to prepare the positive electrode active material according to an aspect of the present disclosure only by a simple process without a thermal treatment process. Additionally, since the thermal treatment process is not used, there is no change in oxidation number or structure of the transition metal compound. Accordingly, it is possible to prepare the positive electrode active material with less side reactions.

Meanwhile, the method may not comprise any washing process between the step (S2) and the step (S3). In this instance, the total amount of lithium remaining on the particle surface after the primary sintering may be 0.5 to 1.5 wt % based on the total weight of the positive electrode active material. The conventional art performs a washing process to wash out the lithium by-products present on the positive electrode active material surface. The lithium by-products cause side reactions with the electrolyte solution in the battery, and increases the amount of produced gas when stored at high temperature. In contrast, the preparation method according to an aspect of the present disclosure does not comprise any washing process. Accordingly, lithium by-products exist on the particle surface, and when the lithium by-products are present in an amount of 0.5 to 1.5 wt % based on the total weight of the positive electrode active material, it is possible to prepare the positive electrode active material comprising a secondary particle agglomerate comprising primary macro particles according to an aspect of the present disclosure.

Positive Electrode and Lithium Secondary Battery

According to another embodiment of the present disclosure, there are provided a positive electrode for a lithium secondary battery comprising the positive electrode active material, and a lithium secondary battery.

Specifically, the positive electrode comprises a positive electrode current collector and a positive electrode active material layer comprising the positive electrode active material, formed on the positive electrode current collector.

In the positive electrode, the positive electrode current collector is not limited to a particular type and may include any type of material having conductive properties without causing any chemical change to the battery, for example, stainless steel, aluminum, nickel, titanium, sintered carbon or aluminum or stainless steel treated with carbon, nickel, titanium or silver on the surface. Additionally, the positive electrode current collector may be generally 3 to 500 μm in thickness, and may have microtexture on the surface to improve the adhesion strength of the positive electrode active material. For example, the positive electrode current collector may come in various forms, for example, films, sheets, foils, nets, porous bodies, foams and non-woven fabrics.

In addition to the above-described positive electrode active material, the positive electrode active material layer may comprise a conductive material and a binder.

In this instance, the conductive material is used to impart conductivity to the electrode, and may include, without limitation, any type of conductive material having electron conductivity without causing any chemical change in the battery. Specific examples of the conductive material may include at least one of graphite, for example, natural graphite or artificial graphite; carbon-based materials, for example, carbon black, acetylene black, ketjen black, channel black, furnace black, lamp black, thermal black and carbon fibers; metal powder or metal fibers, for example, copper, nickel, aluminum and silver; conductive whiskers, for example, zinc oxide and potassium titanate; conductive metal oxide, for example, titanium oxide; or conductive polymers, for example, polyphenylene derivatives. In general, the conductive material may be included in an amount of 1 to 30 weight % based on the total weight of the positive electrode active material layer.

Additionally, the binder serves to improve the bonds between the positive electrode active material particles and the adhesion strength between the positive electrode active material and the positive electrode current collector. Specific examples of the binder may include at least one of polyvinylidene fluoride (PVDF), polyvinylidene fluoride-hexafluoropropylene copolymer (PVDF-co-HFP), polyvinylalcohol, polyacrylonitrile, carboxymethylcellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluoro rubber, or a variety of copolymers thereof. The binder may be included in an amount of 1 to 30 weight % based on the total weight of the positive electrode active material layer.

The positive electrode may be manufactured by the commonly used positive electrode manufacturing method except using the above-described positive electrode active material. Specifically, the positive electrode may be manufactured by coating a positive electrode active material layer forming composition comprising the positive electrode active material and optionally, the binder and the conductive material on the positive electrode current collector, drying and rolling. In this instance, the type and amount of the positive electrode active material, the binder and the conductive material may be the same as described above.

The solvent may include solvents commonly used in the corresponding technical field, for example, at least one of dimethyl sulfoxide (DMSO), isopropyl alcohol, N-methylpyrrolidone (NMP), acetone or water. The solvent may be used in such an amount to have sufficient viscosity for good thickness uniformity when dissolving or dispersing the positive electrode active material, the conductive material and the binder and coating to manufacture the positive electrode in view of the slurry coating thickness and the production yield.

Alternatively, the positive electrode may be manufactured by casting the positive electrode active material layer forming composition on a support, peeling off a film from the support and laminating the film on the positive electrode current collector.

According to still another embodiment of the present disclosure, there is provided an electrochemical device comprising the positive electrode. Specifically, the electrochemical device may include a battery or a capacitor, and more specifically, a lithium secondary battery.

Specifically, the lithium secondary battery comprises a positive electrode, a negative electrode disposed opposite the positive electrode, a separator interposed between the positive electrode and the negative electrode and an electrolyte, and the positive electrode is the same as described above. Additionally, optionally, the lithium secondary battery may further comprise a battery case in which an electrode assembly comprising the positive electrode, the negative electrode and the separator is received, and a sealing member to seal up the battery case.

In the lithium secondary battery, the negative electrode comprises a negative electrode current collector and a negative electrode active material layer positioned on the negative electrode current collector.

The negative electrode current collector may include any type of material having high conductivity without causing any chemical change to the battery, for example, copper, stainless steel, aluminum, nickel, titanium, sintered carbon, copper or stainless steel treated with carbon, nickel, titanium or silver on the surface and an aluminum-cadmium alloy, but is not limited thereto. Additionally, the negative electrode current collector may be generally 3 to 500 μm in thickness, and in the same way as the positive electrode current collector, the negative electrode current collector may have microtexture on the surface to improve the bonding strength of the negative electrode active material. For example, the negative electrode current collector may come in various forms, for example, films, sheets, foils, nets, porous bodies, foams and non-woven fabrics.

In addition to the negative electrode active material, the negative electrode active material layer optionally comprises a binder and a conductive material. For example, the negative electrode active material layer may be made by coating a negative electrode forming composition comprising the negative electrode active material, and optionally the binder and the conductive material on the negative electrode current collector and drying, or by casting the negative electrode forming composition on a support, peeling off a film from the support and laminating the film on the negative electrode current collector.

The negative electrode active material may include compounds capable of reversibly intercalating and deintercalating lithium. Specific examples of the negative electrode active material may include at least one of a carbonaceous material, for example, artificial graphite, natural graphite, graphitizing carbon fibers, amorphous carbon; a metallic compound that can form alloys with lithium, for example, Si, Al, Sn, Pb, Zn, Bi, In, Mg, Ga, Cd, Si alloy, Sn alloy or Al alloy; metal oxide capable of doping and undoping lithium such as $SiO\beta$ ($0<\beta<2$), $SnO_2$, vanadium oxide, lithium vanadium oxide; or a complex comprising the metallic compound and the carbonaceous material such as a Si—C complex or a Sn—C complex. Additionally, a metal lithium thin film may be used for the negative electrode active material. Additionally, the carbon material may include low crystalline carbon and high crystalline carbon. The low crystalline carbon typically includes soft carbon and hard carbon, and the high crystalline carbon typically includes high temperature sintered carbon, for example, amorphous, platy, flaky, spherical or fibrous natural graphite or artificial graphite, Kish graphite, pyrolytic carbon, mesophase pitch based carbon fiber, meso-carbon microbeads, mesophase pitches and petroleum or coal tar pitch derived cokes.

Additionally, the binder and the conductive material may be the same as those of the above-described positive electrode.

Meanwhile, in the lithium secondary battery, the separator separates the negative electrode from the positive electrode and provides a passage for movement of lithium ions, and may include, without limitation, any separator commonly used in lithium secondary batteries, and in particular, preferably the separator may have low resistance to the electrolyte ion movement and good electrolyte solution wettability. Specifically, the separator may include, for example, a porous polymer film made of polyolefin-based polymer such as ethylene homopolymer, propylene homopolymer, ethylene/butene copolymer, ethylene/hexene copolymer and ethylene/methacrylate copolymer or a stack of two or more porous polymer films. Additionally, the separator may include common porous non-woven fabrics, for example, nonwoven fabrics made of high melting point glass fibers and polyethylene terephthalate fibers. Additionally, to ensure the heat resistance or mechanical strength, the coated separator comprising ceramics or polymer materials may be used, and may be selectively used with a single layer or multilayer structure.

Additionally, the electrolyte used in the present disclosure may include an organic liquid electrolyte, an inorganic liquid electrolyte, a solid polymer electrolyte, a gel polymer electrolyte, a solid inorganic electrolyte and a molten inorganic electrolyte, available in the manufacture of lithium secondary batteries, but is not limited thereto.

Specifically, the electrolyte may comprise an organic solvent and a lithium salt.

The organic solvent may include, without limitation, any type of organic solvent that acts as a medium for the movement of ions involved in the electrochemical reaction of the battery. Specifically, the organic solvent may include an ester-based solvent, for example, methyl acetate, ethyl acetate, γ-butyrolactone, ¿-caprolactone; an ether-based solvent, for example, dibutyl ether or tetrahydrofuran; a ketone-based solvent, for example, cyclohexanone; an aromatic hydrocarbon-based solvent, for example, benzene, fluorobenzene; a carbonate-based solvent, for example, dimethylcarbonate (DMC), diethylcarbonate (DEC), ethylmethylcarbonate (EMC), ethylene carbonate (EC), propylene carbonate (PC); an alcohol-based solvent, for example, ethylalcohol, isopropyl alcohol; nitriles of R—CN (R is C2 to C20 straight-chain, branched-chain or cyclic hydrocarbon, and may comprise an exocyclic double bond or ether bond); and amides, for example, dimethylformamide; dioxolanes, for example, 1,3-dioxolane; or sulfolanes. Among them, the carbonate-based solvent is desirable, and more preferably, cyclic carbonate (for example, ethylene carbonate or propylene carbonate) having high dielectric constant which contributes to the improved charge/discharge performance of the battery may be mixed with a linear carbonate-based compound (for example, ethylmethyl carbonate, dimethyl carbonate or diethyl carbonate) of low viscosity. In this case, the cyclic carbonate and the chain carbonate may be mixed at a volume ratio of about 1:1 to about 1:9 to improve the performance of the electrolyte solution.

The lithium salt may include, without limitation, any compound that can provide lithium ions used in lithium secondary batteries. Specifically, the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$. The concentration of the lithium salt may range from 0.1 to 2.0M. When the concentration of the lithium salt is included in the above-described range, the electrolyte has the optimal conductivity and viscosity, resulting in good performance of the electrolyte and effective movement of lithium ions.

In addition to the above-described constituent substances of the electrolyte, the electrolyte may further comprise, for example, at least one type of additive of a haloalkylene carbonate-based compound such as difluoro ethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride to improve the life characteristics of the battery, prevent the capacity fading of the battery and improve the discharge capacity of the battery. In this instance, the additive may be included in an amount of 0.1 to 5 weight % based on the total weight of the electrolyte.

The lithium secondary battery comprising the positive electrode active material according to the present disclosure is useful in the field of mobile devices including mobile phones, laptop computers and digital cameras, and electric vehicles including hybrid electric vehicles (HEVs).

Accordingly, according to another embodiment of the present disclosure, there are provided a battery module comprising the lithium secondary battery as a unit cell and a battery pack comprising the same.

The battery module or the battery pack may be used as a power source of at least one medium-large scale device of power tools; electric vehicles comprising electric vehicles (EVs), hybrid electric vehicles, and plug-in hybrid electric vehicles (PHEVs); or energy storage systems.

Hereinafter, the embodiments of the present disclosure will be described in sufficiently detail for those having ordinary skill in the technical field pertaining to the present disclosure to easily practice the present disclosure. However, the present disclosure may be embodied in many different forms and is not limited to the disclosed embodiments.

Comparative Example 1

4 liters of distilled water is put into a coprecipitation reactor (capacity 20 L), and a transition metal solution with the concentration of 3.2 mol/L, in which $NiSO_4$, $CoSO_4$ and $MnSO_4$ are mixed at a mole ratio of nickel:cobalt:manganese of 0.8:0.1:0.1, and a 28 wt % ammonia aqueous solution are continuously put into the reactor at 300 mL/hr and 42 mL/hr, respectively, while maintaining the temperature at 50° C. Stirring is performed at the impeller speed of 400 rpm, and a 40 wt % sodium hydroxide solution is used to maintain the pH at 9. Precursor particles are formed by 10-hour coprecipitation reaction. The precursor particles are separated, washed and dried in an oven of 130° C. to prepare a precursor.

The $Ni_{0.8}Co_{0.1}Mn_{0.1}(OH)_2$ precursor synthesized by coprecipitation reaction is mixed with LiOH such that a mole ratio of $Li_2CO_3$ and Li/Me (Ni, Co, Mn) is 1.05, and thermally treated at 850° C. for 10 hours in an oxygen atmosphere to prepare a positive electrode active material comprising $LiNi_{0.8}Co_{0.1}Mn_{0.1}O_2$ nickel-based lithium transition metal oxide secondary particle.

In comparative example 1, the secondary particle comprises primary macro particles.

Example 1

A positive electrode active material coated with a ketjen black carbon material on the surface of the secondary particle is prepared by mixing the secondary particle prepared in comparative example 1 with ketjen black at a weight ratio of 99:1, introducing the mixture into a Nobilta mixer and milling at the rotational speed of 3000 rpm for 10 minutes.

Example 2

A positive electrode active material coated with a ketjen black carbon material on the surface of the secondary particle is prepared by the same method as example 1 except that the secondary particle prepared in comparative example 1 is mixed with ketjen black at a weight ratio of 99.5:0.5.

Comparative Example 2

4 liters of distilled water is put into a coprecipitation reactor (capacity 20 L), 100 mL of 28 wt % ammonia aqueous solution is added while maintaining the temperature at 50° C., and a transition metal solution having a concentration of 3.2 mol/L, in which $NiSO_4$, $CoSO_4$ and $MnSO_4$ are mixed a mole ratio of nickel:cobalt:manganese of 0.8:0.1:0.1 and 28 wt % ammonia aqueous solution are continuously introduced into the reactor at the rate of 300 mL/hr and 42 mL/hr, respectively. Stirring is performed at the impeller speed of 400 rpm, and the pH is maintained at 11.0 using 40 wt % sodium hydroxide solution. Precursor particles are formed by 24-hour coprecipitation reaction. The precursor particles are separated and washed and dried in an oven of 130° C. to prepare a precursor.

The $Ni_{0.8}Co_{0.1}Mn_{0.1}(OH)_2$ precursor synthesized by coprecipitation reaction is mixed with $Li_2CO_3$ at a Li/Me (Ni, Co, Mn) mole ratio of 1.05, and thermally treated at 800° C. for 10 hours in an oxygen atmosphere to prepare a positive electrode active material comprising $LiNi_{0.8}Co_{0.1}Mn_{0.1}O_2$ lithium composite transition metal oxide secondary particle.

In comparative example 2, the secondary particle comprises primary micro particles.

Comparative Example 3

A positive electrode active material coated with a ketjen black carbon material on the surface of the secondary particle is prepared by mixing the secondary particle prepared in comparative example 2 with ketjen black at a weight ratio of 99:1, introducing the mixture into a Nobilta mixer, and milling at the rotational speed of 3000 rpm for 10 minutes.

Experimental Example 1: Electrical Conductivity Measurement

The electrical conductivity of the positive electrode active materials according to comparative examples 1 to 3 and example 1 is measured after a rolling process in 1-ton condition. The results are shown in Table 1.

The electrical conductivity is measured using powder resistance measurement equipment. Specifically, after 5 g of the positive electrode active material of each of example 1 and comparative examples 1 to 3 is introduced into a cylindrical 4 pin probe mold, the mold containing the positive electrode active material is pressed under 1 ton pressure, and after the powder resistance is measured, electrical conductivity is calculated.

TABLE 1

| Electrical conductivity (S/cm) | Comparative example 1 | Example 1 | Example 2 | Comparative example 2 | Comparative example 3 |
|---|---|---|---|---|---|
| 1 ton pressure applied | $2.71*10^{4}$ | $1.43*10^{-2}$ | $9.51*10^{-3}$ | $3.94*10^{4}$ | $3.55*10^{-3}$ |

As can be seen from Table 1, in the case of examples 1 and 2, the electrical conductivity is 53 times and 35 times higher than that of comparative example 1, respectively. In contrast, in the case of comparative examples 2 and 3 using the secondary particles comprising the conventional primary micro particles, not the secondary particle comprising primary macro particles according to the present disclosure, the electrical conductivity after carbon material coating (comparative example 3) is 9 times higher than the electrical conductivity before carbon material coating (comparative example 2). Accordingly, it can be seen that the effect is clearly found in the carbon material coating of the secondary particle comprising primary macro particles according to an aspect of the present disclosure. Additionally, objective numerical outcomes also show that example 1 has higher electrical conductivity than comparative example 3 and example 2 having half of the carbon material coating also has higher electrical conductivity than comparative example 3.

Experimental Example 2: Press Density Measurement

After the positive electrode active materials prepared in examples 1 and 2 and comparative examples 1 to 3 are pressed in 1-ton condition, the press density is measured, and the results are shown in the following Table 2.

The press density is measured using HPRM-1000. Specifically, 5 g of the positive electrode active material of each of example 1 and comparative examples 1 to 3 is introduced into a cylindrical mold, and 1-ton pressure is applied to the mold containing the positive electrode active material. Subsequently, the height of the pressed mold is measured using a Vernier caliper and the press density is calculated.

TABLE 2

| Press density (g/cc) | Comparative example 1 | Example 1 | Example 2 | Comparative example 2 | Comparative example 3 |
|---|---|---|---|---|---|
| 1 ton pressure applied | 2.81 | 3.09 | 2.95 | 2.6 | 2.84 |

As can be seen from Table 2, it is found that in the case of carbon material coating, there is an about 5 to 10% increase in press density. In this instance, the carbon material coating on the secondary particle comprising primary macro particles according to an aspect of the present disclosure shows a higher press density value than the carbon material coating on the secondary particle comprising the conventional primary micro particles.

Experimental Example 3: Ratio of Presence of Fine Particles of Less than 1 μm in 9-Ton Rolling Condition 5 g of the positive electrode active material prepared in each of examples 1 and 2 and comparative examples 1 to 3 is put into a cylindrical metal mold having the diameter of 2 cm, undergoes a rolling process in a 9-ton pressure condition using a metal cylinder of the same diameter, and is collected to measure the particle size distribution of each positive electrode active material using Particle Size Distribution (PSD), and the results are shown in the following Table 3.

TABLE 3

| Ratio of presence of fine particles of less than 1 μm (%) | Comparative example 1 | Example 1 | Example 2 | Comparative example 2 | Comparative example 3 |
|---|---|---|---|---|---|
| Before rolling | 0 | 0 | 0 | 0 | 0 |
| After rolling | 1.91 | 0.18 | 0.51 | 9.14 | 13.63 |

As can be seen from Table 3, examples 1 and 2 show about 90.6% and 73.3% improvements in the fine particle formation, respectively. In contrast, comparative example 3 having carbon material coating on the secondary particle comprising primary micro particles does not have any improvement in the fine particle formation, and rather shows a 49.1% decrease, compared to comparative example 2 before carbon material coating.

Experimental Example 4: Residual Capacity Comparison of Batteries in 100 Charge/Discharge Cycles Lithium secondary battery half cells are manufactured using the positive electrode active materials prepared in examples 1 and 2 and comparative examples 1 to 3, and capacity retention and resistance increase are measured by the following method.

The positive electrode active material prepared in each of example and comparative example, a carbon black conductive material and a PVdF binder are mixed in an N-methylpyrrolidone solvent at a weight ratio of 96:2:2 to prepare a positive electrode material mixture, and the positive electrode material mixture is coated on one surface of an aluminum current collector, dried at 100° C. and rolled to manufacture a positive electrode.

Lithium metal is used for a negative electrode.

An electrode assembly including the positive electrode and the negative electrode manufactured as described above and a porous polyethylene separator between the positive electrode and the negative electrode is made and placed in a case, and an electrolyte solution is injected into the case to manufacture a lithium secondary battery. In this instance, the electrolyte solution is prepared by dissolving 1.0M lithiumhexafluorophosphate ($LiPF_6$) in an organic solvent comprising ethylenecarbonate/ethylmethylcarbonate/diethylcarbonate/(a mix volume ratio of EC/EMC/DEC=3/4/3).

The manufactured lithium secondary battery half cell is charged at 0.7C, 45° C. in CC-CV mode until 4.2V, and discharged at 0.5C constant current until 3.0V, and capacity retention in 100 cycles of charge/discharge test is measured to evaluate the life characteristics. The results are shown in the following Table 4.

TABLE 4

| After 100 cycles | Comparative example 1 | Example 1 | Example 2 | Comparative example 2 | Comparative example 3 |
|---|---|---|---|---|---|
| Capacity retention (%) | 94.0 | 97.2 | 96.5 | 92.9 | 93.0 |
| Resistance increase (%) | 158.5 | 112.4 | 120.3 | 114.4 | 118.6 |

As can be seen from Table 4, it is found that examples 1 and 2 are superior in terms of capacity retention and resistance increase over comparative example 1. In contrast, in the case of comparative examples 2 and 3 related to the secondary particles comprising primary micro particles, it can be seen that comparative example 3 with carbon material coating is at the equivalent level of capacity retention and rather shows a resistance increase when compared with comparative example 2 without carbon material coating.

What is claimed is:

1. A positive electrode active material for a lithium secondary battery, comprising:

a secondary particle comprising an agglomerate of primary macro particles; and a coating layer directly disposed on a surface of the secondary particle, the coating layer comprising a carbon material, wherein an average particle size (D50) of the primary macro particle is 1.5 μm or more, an average particle size (D50) of the secondary particle is 3 to 10 μm, and the positive electrode active material comprises a nickel-based lithium transition metal oxide.

2. The positive electrode active material for a lithium secondary battery according to claim 1, wherein the carbon material included in the coating layer is present in an amount of 0.3 to 5 parts by weight based on 100 parts by weight of the secondary particle.

3. The positive electrode active material for a lithium secondary battery according to claim 1, wherein the coating layer is 10 nm to 50 nm in thickness.

4. The positive electrode active material for a lithium secondary battery according to claim 1, wherein the carbon material comprises at least one of carbon nanotubes, carbon nanofibers, carbon nanoribbons, carbon nanobelts, carbon nanorods, graphene, graphene oxide, reduced graphene oxide, carbon black, activated carbon or mesoporous carbon.

5. The positive electrode active material for a lithium secondary battery according to claim 1, wherein the nickel-based lithium transition metal oxide is $Li_a[Ni_xCo_yMn_{1-x-y}]O_{2+b}$, in which $0.9 \le a \le 1.5$, $-0.1 \le b \le 1.0$, $0.5 \le x \le 0.95$, and $0 < y \le 0.5$.

6. The positive electrode active material for a lithium secondary battery according to claim 1, wherein a ratio of the average particle size (D50) of the primary macro particle to an average crystal size of the primary macro particle is 2 or more.

7. The positive electrode active material for a lithium secondary battery according to claim 1, wherein an average crystal size of the primary macro particle is 130 nm or more.

8. The positive electrode active material for a lithium secondary battery according to claim 1, wherein a ratio of the average particle size (D50) of the secondary particle to the average particle size (D50) of the primary macro particle is 2 to 5.

9. The positive electrode active material for a lithium secondary battery according to claim 1, wherein the primary macro particle is separated from the secondary particle and does not crack itself in a rolling process of the positive electrode active material.

10. The positive electrode active material for a lithium secondary battery according to claim 9, wherein the rolling process is performed in a 1-ton condition.

11. The positive electrode active material for a lithium secondary battery according to claim 1, wherein a ratio of presence of fine particles of less than 1 μm is 1% or less when a rolling process of the positive electrode active material is performed in a 9-ton condition.

12. A positive electrode for a lithium secondary battery comprising the positive electrode active material according to claim 1 and a current collector.

13. A lithium secondary battery comprising the positive electrode active material according to claim 1 and a negative electrode.

* * * * *